Oct. 27, 1942.　　　　G. F. WIKLE　　　　2,300,242
BUFFING MACHINE
Filed Oct. 17, 1940　　　3 Sheets-Sheet 2
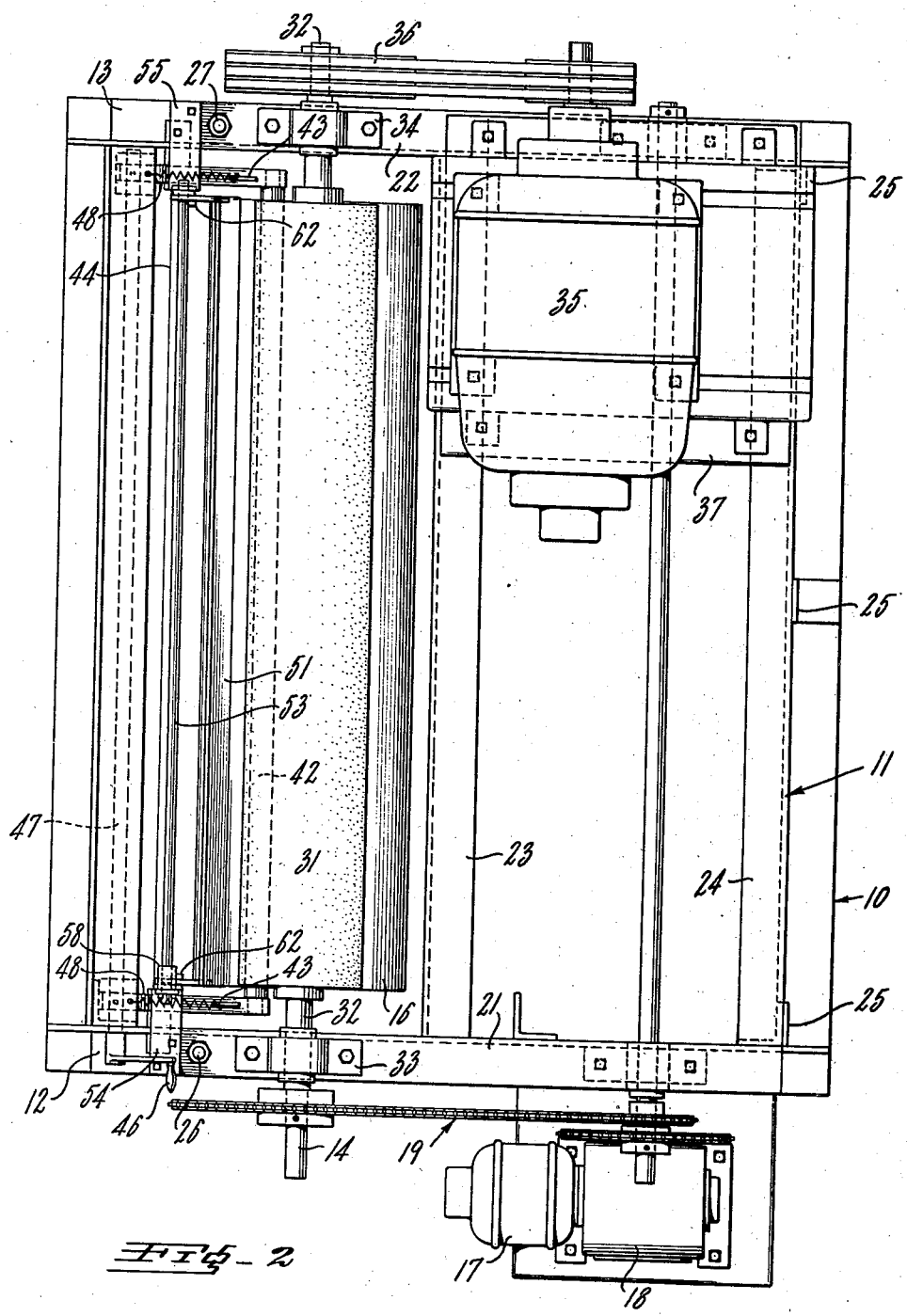
INVENTOR.
GEORGE F. WIKLE
BY
ATTORNEY Oct. 27, 1942.　　　G. F. WIKLE　　　2,300,242
BUFFING MACHINE
Filed Oct. 17, 1940　　　3 Sheets-Sheet 3
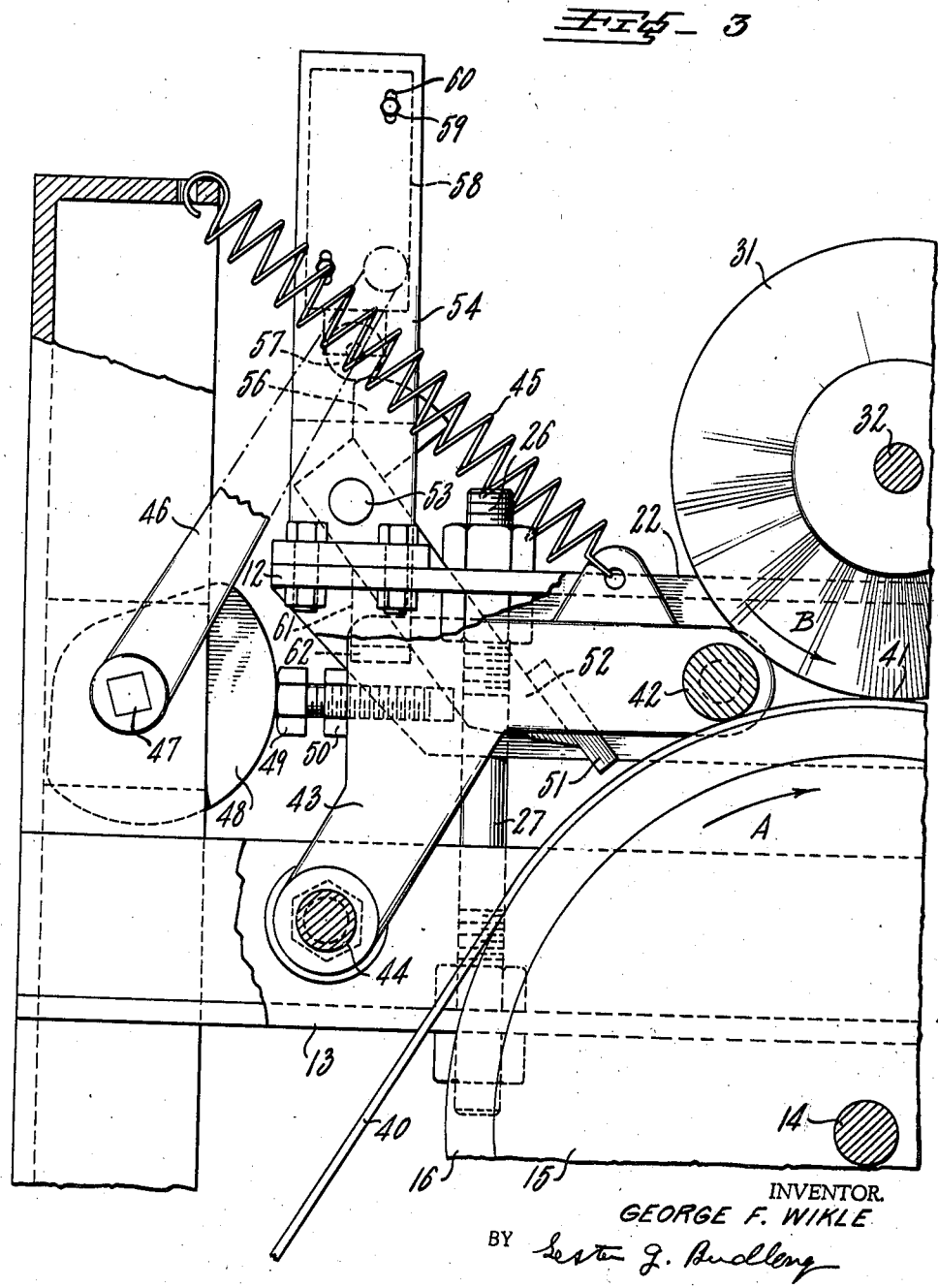
INVENTOR.
GEORGE F. WIKLE
BY
ATTORNEY Patented Oct. 27, 1942

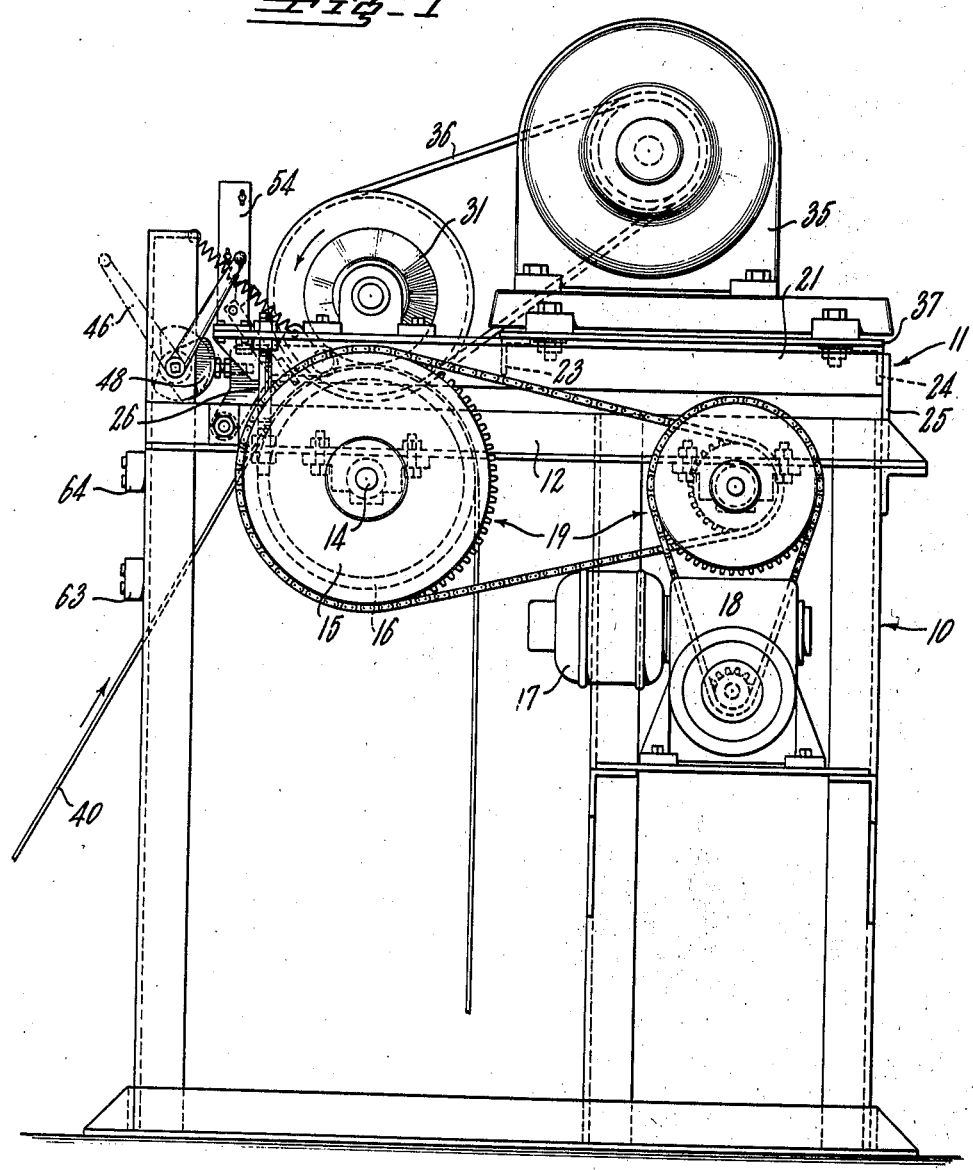

2,300,242

UNITED STATES PATENT OFFICE 2,300,242

BUFFING MACHINE

George F. Wikle, Detroit, Mich., assignor to United States Rubber Company, New York, N. Y., a corporation of New Jersey Application October 17, 1940, Serial No. 361,531

1 Claim. (Cl. 51—78)

This invention relates to buffing machines and more particularly relates to buffing machines adapted for processing relatively wide elongated sheets or strips of relatively soft yieldable vulcanized rubber composition, and the like, in a substantially continuous manner.

When the adjacent surfaces of two or more pieces of cured or vulcanized rubber composition are to be joined together by a subsequent vulcanization therebetween, it is common practice to buff, sand or otherwise roughen these adjacent surfaces before the vulcanizable rubber cement, or similar material, is applied thereto. This buffing or roughening is necessary in order to obtain a secure integral union between these surfaces of cured stock during the subsequent vulcanizing operation. Heretofore, in cases where such buffing of the cured stock was performed manually and particularly where this stock comprised relatively large sheets or elongated strips of material, much time and effort was required and much difficulty experienced in obtaining the complete and uniform results desired over the entire surface or surfaces of the rubber composition; and in cases where these relatively large sheets or strips were of considerable thickness and formed from very soft and yieldable vulcanized rubber composition it was found to be most difficult to handle and prepare the material properly and without injury thereto.

The buffing machine of the present invention substantially eliminates these and other objectionable conditions encountered heretofore by providing means for automatically and continuously feeding sheets or strips of vulcanized rubber composition through the machine at a uniform predetermined speed while engaging and holding successive portions of the material in proper position as the buffing operations are performed thereon. Convenient and quickly adjustable means are also provided for accommodating sheets or strips of rubber composition of various thicknesses and hardnesses passing through the machine. The machine is so constructed and arranged that its operation is immediately subject to the control of the operator and automatic safety means is provided to function in cooperation therewith for preventing injury to the operator during operation of the machine.

The invention will be more readily understood from the following description when taken in conjunction with the accompanying drawings, in which:

Fig. 1 is a side elevational view showing a preferred embodiment of the invention;

Fig. 2 is a plan view of the buffing machine of Fig. 1; and,

Fig. 3 is an enlarged view, partly in section and partly broken away, of the details of a portion of the machine shown in Fig. 1.

Referring to the drawings in detail and in particular to Figs. 1 and 2, the reference numeral 10 indicates generally a main frame upon the top of which is carried a secondary frame 11 in spaced relation therewith. Carried upon spaced upper side bars 12 and 13 of the main frame 10 is a rotatably mounted shaft 14 upon which is keyed or otherwise secured, between the side bars 12 and 13, a relatively wide work-supporting drum 15. Upon the outer surface of this drum 15 is secured a relatively thick soft covering layer of rubber composition 16; the cushioning and anti-slip purposes of which will be more fully hereinafter described. Power means, in the form of a conventional electric motor 17 and reduction gearing 18 attached upon the side of the main frame 10, and a system of chains and sprockets generally indicated by the numeral 19 serve to drive the shaft 14 at a comparatively slow but positive and uniform rate of speed.

The secondary frame 11, which comprises spaced side bars 21 and 22 interconnected by transverse angle bars 23 and 24, is supported along its rear edge by flat metallic plates 25 rigidly secured, in any suitable manner, such as by welding, to the bar 24 and to an upper transverse member at the rear of the main frame 10 so as to flex slightly and allow a limited amount of vertical adjustment of the forward end of the secondary frame relative to the main frame 10. This adjustment is effective through the means of a pair of vertically extending threaded rods 26 and 27 which are positioned at opposite sides of the machine and have their opposite ends located in openings in the side bars 12 and 13 of the main frame 10 and in the side bars 21 and 22 of the secondary frame 11, respectively. These rods 26 and 27 are provided with suitable clamping nuts on opposite sides of each of the said side bars so that exact increments of adjustment of the forward end of the secondary frame relative to the main frame may be easily and quickly obtained by the operator of the machine when desired. The purpose of this adjustment is to accommodate strips or sheets of material of various thicknesses being fed through the machine.

A relatively wide buffing wheel 31, preferably in the form of circular wire brushes, sanding drums, or the like, is clamped or otherwise removably secured upon a shaft 32 for rotation therewith in supporting bearings 33 and 34 upon the side bars 21 and 22, respectively, and is connected to a conventional electric motor 35 by a multiple V-belt drive generally indicated by the numeral 36. This motor is adjustably mounted upon a supporting plate 37 carried by the transverse angle bars 23 and 24 of the secondary frame in any well known manner.

Referring in detail to Fig. 3, it will be seen that when a wide flat strip of sheet material 40, such as soft yieldable vulcanized rubber composition, is fed onto the rubber covered drum 15 rotating slowly in the direction of the arrow A, the material will be carried by the drum into the bite region 41 between the buffing wheel 31 and the drum 15. The buffing wheel 31 rotates in the direction indicated by the arrow B but at a speed much greater than the speed of the drum 15. Since the normal tendency of the fast moving wheel 31 is to drag the strip material 40 rapidly through the machine suitable means is provided to prevent such a condition, which means is in the form of a wide steel pressure roll 42 positioned adjacent and in parallel relation to the drum 15 and rotatably carried by a pair of bell-crank levers 43 suitably mounted upon a transverse shaft 44 mounted in the side bars 12 and 13 at opposite sides of the main frame 10. The pressure roll 42 is intended to bear against the upper surface of the strip material resting upon the drum 15 and to hold this material in contact with the soft rubber covering 16 of this drum as the material is fed into the bite region 41 between the wheel 31 and the drum 15. The roll 42 is of a comparatively small diameter and positioned near the bite region 41 so that the material will be correctly guided and controlled as it enters this region. By locating the roll 42 near the bite region it is possible to properly buff the strip or sheet material closer to the rear edge thereof than would be possible otherwise. A pair of coil springs 45 at opposite sides of the machine are connected to the free ends of the levers 43 and to a fixed upwardly extending portion of the main frame 10 so that a constant pull will be exerted upon these levers which tends to elevate the pressure roll above the drum 15.

Manually controlled means in the form of a hand crank 46 mounted upon a transverse shaft 47 mounted in the upwardly extending portion of the main frame 10 serves to actuate a pair of slightly eccentric cams 48 carried near the opposite ends of the shaft so as to force the levers 43 and thus the pressure roll 42 into operative position against the material 40 upon the drum 15. A pair of bolts 49 threaded into intermediate parts of the bell crank levers 43 serve to adjustably vary the operative position of the pressure roll 42 depending upon the thickness, and other physical properties such as hardness, of the particular vulcanized rubber strip material being fed through the machine. Lock nuts 50 shown upon the bolts 49 are employed for holding the bolts in proper adjusted position.

Also shown in Fig. 3 is a safety control device for preventing injury to the operator of the machine, such as having his fingers accidentally caught between the drum 15 and the pressure rolls 42 while attempting to start a new strip of material through the machine. This device comprises a guard plate 51 normally positioned closely adjacent the surface of the drum 15 and of sufficient width to extend the entire length of the drum. This guard plate has its opposite ends welded or otherwise secured to a pair of levers 52 fixedly mounted upon a shaft 53 pivotally carried in apertures in upwardly extending portions of a pair of brackets 54 and 55 secured upon the side bars 21 and 22 of the secondary frame 11. A cam 56 integrally carried upon a top of one of the levers 52 is so located as to engage a roller 57 extending from the bottom of an electric safety switch 58 positioned upon a side of the upwardly extending portion of the bracket 54. Bolts 59, or similar securing means, extend through slots 60 in the bracket 54 and allow for proper adjustment of the switch 58 and thus the roller 57 relative to the cam 56. Arms 61, arranged to extend downwardly from the brackets 54 and 55, are provided with inwardly projecting lugs 62 arranged to serve as limiting means or stops for preventing downward swinging movement of the guard plate 51 beyond its normal operative position shown in Fig. 3.

An electric switch 63 (Fig. 1), of a conventional type having starting and stopping buttons, is provided upon the front of the main frame 10, for controlling the electric motor 17 driving the drum 15. The electric safety switch 58, previously referred to, is connected in series with the switch 63 and the motor 17 for instantly stopping the motor when this electric circuit (not shown) is interrupted.

It will be seen from the foregoing description that during the operation of the safety device, even the slightest pivotal movement of the guard plate 51 upwardly and rearwardly about the shaft 53 by the hand of the operator will cause the cam 56 to elevate the roller 57 and thus actuate the switch 58; immediately stopping the motor 17 and the supporting drum 15. With the parts of the safety device so constructed and arranged, it will be apparent that it is practically impossible for the operator of the machine to become injured while feeding stock material onto the drum 15.

An additional electric switch 64, similar to the switch 63, is located upon the front of the main frame 10 and is connected to the motor 35 so as to place the operation of this motor conveniently under the control of the operator of the buffing machine.

When it is desired to operate the buffing machine of the present invention, the rotation of the drum 15 and the buffing wheel 31 is started by pushing the starting buttons on the switches 63 and 64 respectively. The control handle 46 is then moved to the dotted line position shown in Fig. 1; which action releases the levers 43 and allows the spring 45 to retract the pressure roll 42 sufficiently to allow the strip material 46 to be fed or drawn between the roll 42 and drum 15. The pressure roll 42 is then applied against the strip 40 by swinging the lever 46 to its heavy line position. It will be noted that the forward edge of the side bar 12, or the bracket 54 carried thereon, serves to limit the rearward swinging movement on the handle 46. When stock of a slightly different thickness is supplied to the machine the bolts 49 may be adjusted slightly to care for such changes before the operation of the machine is commenced.

It has been found in actual practice desirable to stop the buffing wheel 31 from rotating just before the last end of the strip or sheet of rubber composition passes from beneath the roll 42, so that the strip will not be pulled into and piled up in the bite region 41 by the rapidly moving wheel 31 and thus injure the stock or possibly parts of the machine as well.

The use of the comparatively thick soft layer 16 of rubber composition on the drum 15 has several advantages. The relatively high coefficient of friction between the strip material and the drum covering prevents relative slipping between the material and the drum under the "dragging" influence of the wheel 31. This thick layer 16 also yields under the pressure of the roll 42 and affords a wider area of contact for this roll, thus allowing the use of greater pressures upon the material without injury to the material. Yielding of the layer 16 also produces a somewhat wider or greater area in contact with the buffing wheel at any given time.

Thus it will be seen that I have provided a buffing machine which will easily, quickly and substantially automatically roughen or buff wide strips of soft vulcanized rubber composition, or other similar strip material, in an efficient, complete and uniform manner.

Although the invention has been disclosed in connection with the specific details of a preferred embodiment thereof, it will be readily understood that such details are not intended to be limitative of the invention except insofar as is set forth in the accompanying claim.

Having thus described my invention what I claim and desire to protect by Letters Patent is:

A machine for buffing elongated strips or sheets of relatively soft yieldable material comprising in combination a main frame having a work-supporting drum rotatably mounted thereon, a presser roll mounted on said frame for holding sheets of material on the drum, independent driving means for rotating said drum supported on said frame, a secondary frame above the main frame, a buffing wheel rotatably supported in the secondary frame adjacent one end thereof, independent driving means supported by the secondary frame for rotating the buffing wheel, relatively rigid slightly bendable means supporting the opposite end of the secondary frame and connecting said opposite end to the main frame whereby the weight of said buffing wheel and its driving means will constantly urge said buffing wheel towards the work-supporting drum, and an adjustable support for supporting the first mentioned end of the secondary frame upon the main frame and for limiting the approach of the buffing wheel toward the work-supporting drum.

GEORGE F. WIKLE.